March 26, 1935.  C. L. WILLIAMS ET AL  1,995,909

AUTOMOBILE ENGINE FLYWHEEL LOCK OR THE LIKE

Filed March 13, 1933   2 Sheets—Sheet 1

Clarence L. Williams
Earl M. Simmons
INVENTORS

BY Victor J. Evans & Co.
ATTORNEY

March 26, 1935.  C. L. WILLIAMS ET AL  1,995,909
AUTOMOBILE ENGINE FLYWHEEL LOCK OR THE LIKE
Filed March 13, 1933  2 Sheets-Sheet 2
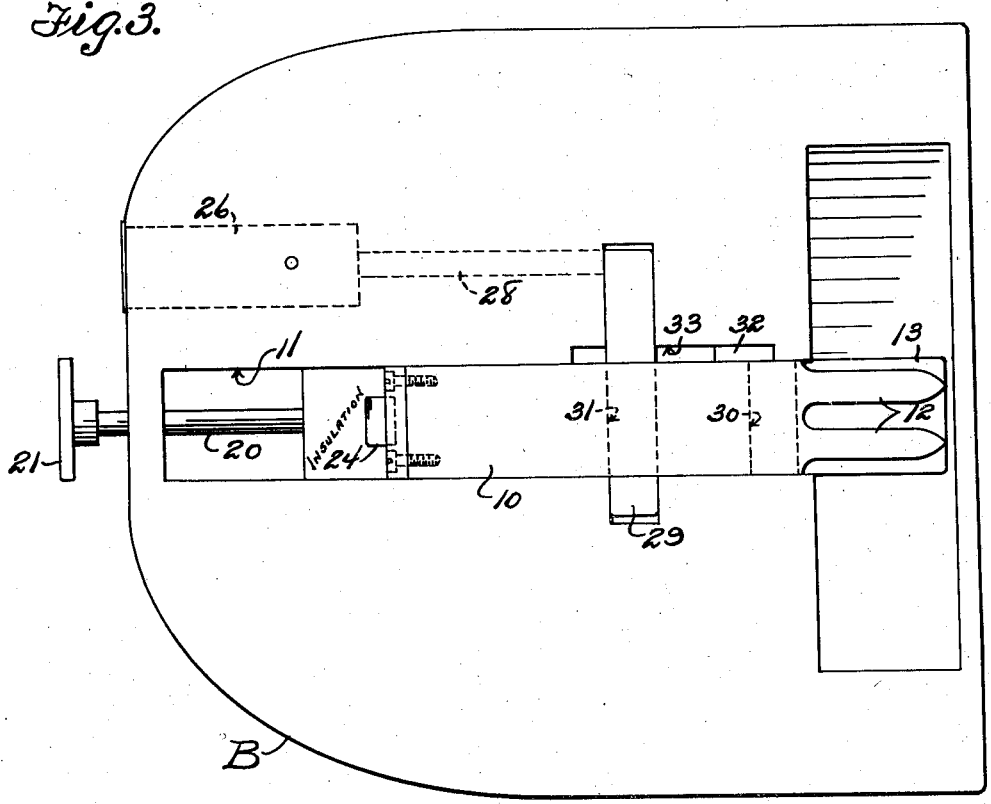
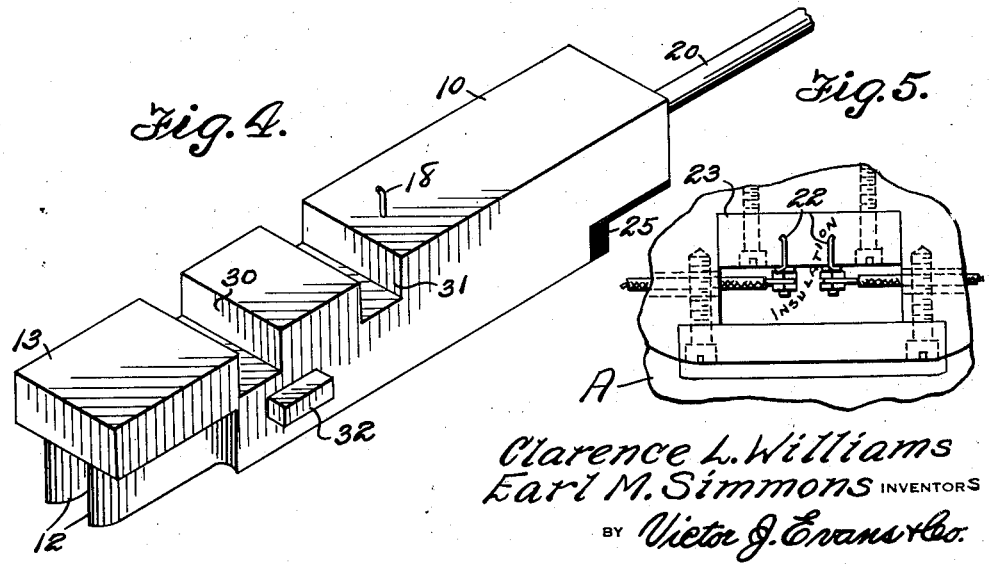
Clarence L. Williams
Earl M. Simmons INVENTORS
BY Victor J. Evans & Co.
ATTORNEY Patented Mar. 26, 1935

1,995,909

UNITED STATES PATENT OFFICE 1,995,909

AUTOMOBILE ENGINE FLYWHEEL LOCK OR THE LIKE

Clarence L. Williams and Earl M. Simmons, Jackson, Miss., assignors of one-third to Knox M. Broom, Jackson, Miss.

Application March 13, 1933, Serial No. 660,587

9 Claims. (Cl. 70—90)

The invention relates to a combined lock and electric switch and more especially to an automobile motor fly wheel and electric ignition lock.

The primary object of the invention is the provision of a lock of this character, wherein the lock proper for the motor fly wheel and the switch for the electric ignition system are concealed wholly within the transmission housing or casing of the motor so that it is impossible for a person, either malicious or theft inclined, to tamper or gain access to the lock for its manipulation, the lock being only operative by its key.

Another object of the invention is the provision of a lock of this character, wherein the fly wheel of the motor of an automobile can be locked and the control of such lock is by the foot of the operator of the automobile, the mechanism for the locking of the fly wheel being locked from a key operated locking mechanism, the parts of the lock being confined within the transmission housing or casing, thus it being impossible for fraudulent tampering therewith and such lock controlling the opening and closing of a switch arranged in the electric ignition system of the automobile so that such lock has a dual function and security.

A further object of the invention is the provision of a lock of this character which is simple in construction, thoroughly reliable and efficient in its operation, assuring protection to a motor vehicle against theft, readily and easily operated, strong, durable, entirely concealed to eliminate tampering with, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 3 is a plan view looking toward the inner side of a separable section or part of the transmission casing, showing in detail the lock.

Figure 4 is a perspective view of the sliding locking bolt for the fly wheel of the automobile motor.

Figure 5 is a fragmentary detail view of the switch for controlling the electric transmission system of the automobile.

Similar reference characters indicate corresponding parts throughout the several views in the drawings.

Figure 1:
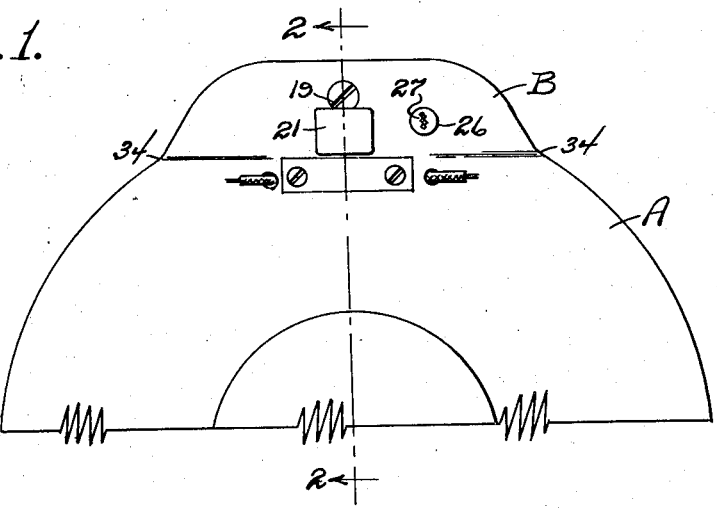
Figure 1 is a fragmentary elevation of a transmission housing or casing, showing the lock associated therewith in accordance with the invention.
Figure 2:
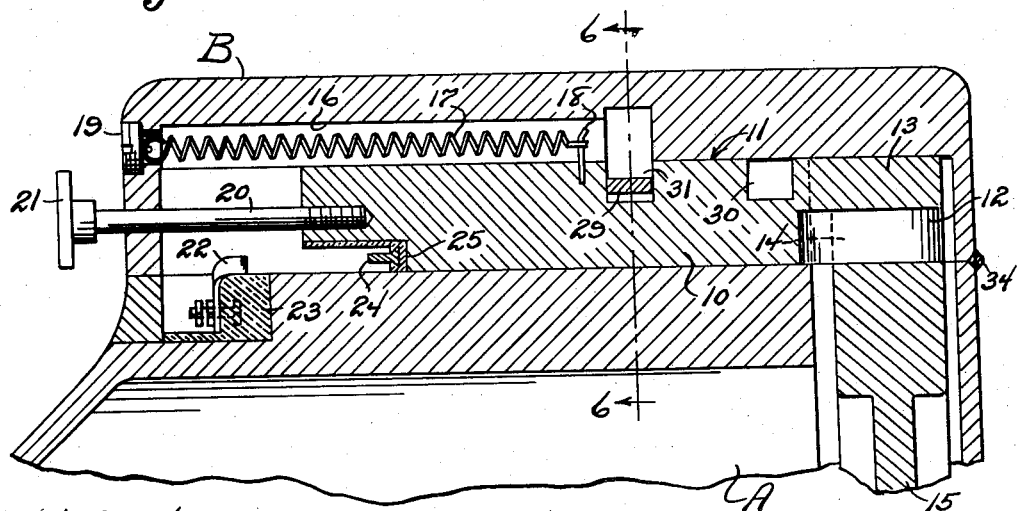
Figure 2 is an enlarged sectional view on the line 2—2 of Figure 1 looking in the direction of the arrows.
Figure 6:
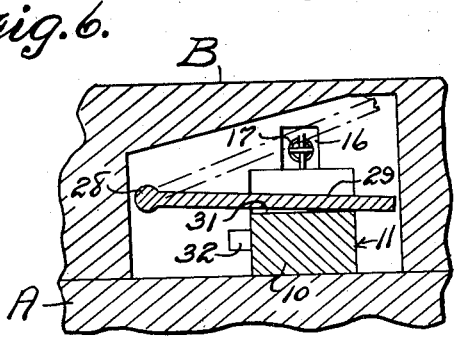
Figure 6 is a fragmentary sectional view on the line 6—6 of Figure 2 looking in the direction of the arrows.

Referring to the drawings in detail, A designates generally a portion of the transmission housing of an internal combustion motor for an automobile and B an upper separable part of said housing. Located within this part B is the lock constituting the present invention and hereinafter fully described.

The lock comprises a sliding locking bolt 10 which is movable in a guideway 11 formed in the bottom or under face of the part B and has at one end plural locking teeth 12, these being undercut in the said bolt to have the latter provide an overhang 13 to said teeth, the latter being adapted to mesh with the teeth 14 of a fly wheel 15 of an internal combustion motor for the locking of such wheel.

Communicating with the guideway 11 is a space 16 accommodating a coiled retractile spring 17, the same being detachably engaged with a hook 18 mounted in the bolt 10 and also engaged with a removable plug 19 fitted in said part B, the spring being designed to tension the bolt 10 for retracting it from meshing engagement with the fly wheel 15.

Threaded in the bolt 10 is a push stem 20, the same working through a suitable opening in the part B to protrude therefrom and carrying a button 21 or a foot piece so that such bolt 10 by engaging the foot of a person with the button or piece 21 can be shifted against the resistance of the spring 17 into meshing locking engagement with the fly wheel 15.

Arranged within the electric ignition system of the motor vehicle are the switch contacts 22, these being supported in an insulating base 23 countersunk in the housing or casing B, the contacts 22 being disposed in a path of a switch blade 24 insulated at 25 from and mounted upon the bolt 10. The blade 24 when engaging the contacts 22 closes the electric ignition system (not shown).

Suitably fitted in the part B of the housing or casing A is a pin tumbler lock case 26 which is of the key operated style, the slot 27 for the key being exposed through the part B and this lock operates a turning shaft 28 confined within the part B, which shaft has thereon a latching dog or pawl 29 disposed crosswise with relation to the bolt 10 and receivable in the respective seats 30 and 31 in said bolt. Thus, by reason of the disposition of the seats 30 and 31, the bolt 10 when thrown to locking engagement with the fly wheel 15 can be made secure in such position and also when this bolt 10 is thrown to close the electric switch in the ignition system it can be latched secure. In this latter position the bolt 10 is released from the fly wheel 15.

The bolt 10 at one side thereof is formed with a stop key 32 which engages in a guideway 33 in the part A so that such bolt, due to the extent of the way 33, will be limited in its throw in opposite directions.

The part B having fitted therewith the lock hereinbefore described is brought into position upon the housing A and the seam or joint therebetween is welded as at 34, thus making this part unitary with the housing and eliminating access to the lock within the same and making it impossible for illegal or fraudulent tampering therewith.

It should be apparent that the spring 17, under its tension, normally positions the bolt 10 out of locking engagement with the fly wheel 15 and the switch blade 24 engaged with the contacts 22 of the electric ignition system.

The security of the lock and the working thereof should be clearly apparent from the foregoing description and therefore a more extended explanation is omitted for the sake of brevity.

What is claimed is:

1. In a lock of the character described, a sliding locking bolt confined within a housing for the fly wheel of an internal combustion engine and movable into locking and unlocking position relative thereto, and a key operated lock alongside said sliding locking bolt, a rockshaft paralleling said sliding locking bolt and operatively connected to said lock, a lateral latch arm carried by said rock shaft and cooperatively engageable with the bolt to hold the same in thrown positions.

2. In a lock of the character described, a sliding locking bolt confined within a housing for the fly wheel of an internal combustion engine and movable into locking and unlocking position relative thereto, a key operated lock alongside said sliding locking bolt, a rockshaft paralleling said sliding locking bolt and operatively connected to said lock, a lateral latch arm carried by said rock shaft and cooperatively engageable with the bolt to hold the same in thrown positions, and a separable part of said housing for confining the bolt and lock and secured to the housing, said separable housing part providing a lineal guide way for said locking bolt substantially at right angles to one side of said fly wheel and communicating therewith adjacent its periphery.

3. In a lock of the character described a sliding locking bolt confined within a housing for the fly wheel of an internal combustion engine and movable into locking and unlocking position relative thereto, a key operated lock alongside said sliding locking bolt, a rockshaft paralleling said sliding locking bolt and operatively connected to said lock, a lateral latch arm carried by said rock shaft and cooperatively engageable with the bolt to hold the same in thrown positions, a separable part of said housing for confining the bolt and lock and secured to the housing, said separable housing part providing a lineal guide way for said locking bolt substantially at right angles to one side of said fly wheel and communicating therewith adjacent its periphery, and a push member exposed through the housing at one side of the separable part thereof and adjacent said lock, and manually operable to move the bolt when free into locking engagement with the fly wheel.

4. In a lock of the character described, a sliding locking bolt confined within a housing for the fly wheel of an internal combustion engine and movable into locking and unlocking position relative thereto, a key operated lock alongside said sliding locking bolt, a rockshaft paralleling said sliding locking bolt and operatively connected to said lock, a lateral latch arm carried by said rock shaft and cooperatively engageable with the bolt to hold the same in thrown positions, a separable part of said housing for confining the bolt and lock and secured to the housing, said separable housing part providing a lineal guide way for said locking bolt substantially at right angles to one side of said fly wheel and communicating therewith adjacent its periphery, a push member exposed through the housing at one side of the separable part thereof and adjacent said lock, and manually operable to move the bolt when free into locking engagement with the fly wheel, and means detachably carried by said separable housing part and operative upon the bolt to normally hold it disengaged from the fly wheel.

5. In a lock of the character described, a sliding locking bolt confined within a housing for the fly wheel of an internal combustion engine and movable into locking and unlocking position relative thereto, a key operated lock alongside said sliding locking bolt, a rockshaft paralleling said sliding locking bolt and operatively connected to said lock, a lateral latch arm carried by said rock shaft and cooperatively engageable with the bolt to hold the same in thrown positions, a separable part of said housing for confining the bolt and lock and secured to the housing, said separable housing part providing a lineal guide way for said locking bolt substantially at right angles to one side of said fly wheel and communicating therewith adjacent its periphery, a push member exposed through the housing and at one side of the separable part thereof and adjacent said lock, and manually operable to move the bolt when free into locking engagement with the fly wheel, means detachably carried by said separable housing part and operative upon the bolt to normally hold it disengaged from the fly wheel, and teeth formed on the bolt at the outer end of one longitudinal edge only for meshing engagement with teeth of the fly wheel, said bolt having a solid reinforcing extension overlying said bolt teeth.

6. In a gear lock for automobile transmissions carried by the transmission housing, a sliding lock bolt, the transmission providing a slideway for said bolt opening toward one side of the gear adjacent the periphery thereof, actuating means for the bolt, a rock shaft alongside said bolt, a separate lock operated means connected to said rock shaft, a lateral latch arm on said rock shaft, and said bolt having seats adapted to selectively receive said latch arm.

7. In a transmission gear lock a body, a bolt slidable in said body and having an integral plate like extension of reduced thickness as compared to the major portion of the bolt, gear-engaging teeth in part carried by each of major and extension portions of the bolt and integral with both of same, and said extension overlying said teeth as a guard.

8. In a transmission gear lock a body, a bolt slidable in said body and having an integral plate like extension of reduced thickness as compared to the major portion of the bolt, gear-engaging teeth in part carried by each of major and extension portions of the bolt and integral with both of same, said extension overlying said teeth as a guard, a manually operable rock shaft mounted on said body parallel with said bolt, a transverse latch fast on said rock shaft and said bolt providing a seat for receiving said latch.

9. In a transmission gear lock a body, a bolt slidable in said body having an integral plate like extension of reduced thickness as compared to the major portion of the bolt, gear-engaging teeth in part carried by each of major and extension portions of the bolt and integral with both of same, said extension overlying said teeth as a guard, a manually operable and swingably supported latch carried by said body and disposed transversely of said bolt, and said bolt having a seat for said latch.

CLARENCE L. WILLIAMS.
EARL M. SIMMONS.